(12) United States Patent  (10) Patent No.: US 7,576,290 B1
Korcz  (45) Date of Patent: Aug. 18, 2009

(54) ELECTRICAL CABLE CONNECTOR ASSEMBLY AND RETAINING SPRING

(75) Inventor: Krzysztof W. Korcz, Granger, IN (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 12/033,192

(22) Filed: Feb. 19, 2008

(51) Int. Cl.
H02G 3/18 (2006.01)

(52) U.S. Cl. .............. 174/655; 174/650; 174/659; 16/2.1; 285/194; 439/98

(58) Field of Classification Search ............ 174/650, 174/655–668, 151, 153 G, 152 G, 59–61; 16/2.1, 2.2; 248/56; 439/98, 583, 610, 552, 439/557, 921; 285/194
See application file for complete search history.

(56) References Cited

U.S. PATENT DOCUMENTS

| 498,537 | A | * | 5/1893 | Dressler ............... 142/10 |
| 1,793,884 | A | | 2/1931 | Church |
| 2,457,235 | A | | 12/1948 | Hoehn |
| 2,615,362 | A | | 10/1952 | Churchman |
| 2,744,769 | A | | 5/1956 | Roeder et al. |
| 2,865,978 | A | * | 12/1958 | Modrey ............... 174/69 |
| 4,180,227 | A | | 12/1979 | Gretz |
| 4,427,248 | A | | 1/1984 | Smith |
| 4,619,332 | A | * | 10/1986 | Sheehan ............... 174/659 |
| 4,970,350 | A | | 11/1990 | Harrington |
| 5,266,050 | A | * | 11/1993 | O'Neil et al. .......... 439/552 |
| 5,704,400 | A | * | 1/1998 | Eldridge ............... 138/96 T |
| 5,731,543 | A | | 3/1998 | Jorgensen |
| 5,912,431 | A | * | 6/1999 | Sheehan ............... 174/653 |
| 6,020,557 | A | | 2/2000 | Jorgensen |
| 6,034,326 | A | | 3/2000 | Jorgensen |
| 6,114,630 | A | | 9/2000 | Gretz |
| 6,140,582 | A | | 10/2000 | Sheehan |
| 7,154,054 | B1 | * | 12/2006 | Gretz et al. ............. 174/655 |
| 2007/0163804 | A1 | | 7/2007 | Auray et al. |

* cited by examiner

*Primary Examiner*—Dhiru R Patel
(74) *Attorney, Agent, or Firm*—Garrett V. Davis; Mark S. Bicks; Alfred N. Goodman

(57) ABSTRACT

A conduit connector assembly which receives an end of a conduit carrying electrical wires includes a sleeve, a spring clip and a retaining spring. The retaining spring and the spring clip are each coupled to the sleeve. The spring clip is disposed within an interior passage of the sleeve and has a resiliently flexible body and a leg having a gripping end portion. The gripping end has a configuration for gripping and fitting partially about the conduit so as to center the grip end of the spring clip body on the conduit. The retaining spring includes a leg extending into the sleeve and a body contacting the outer surface of the spring clip to hold the spring clip in position and apply a biasing tension of the gripping end of the leg against the conduit.

24 Claims, 3 Drawing Sheets

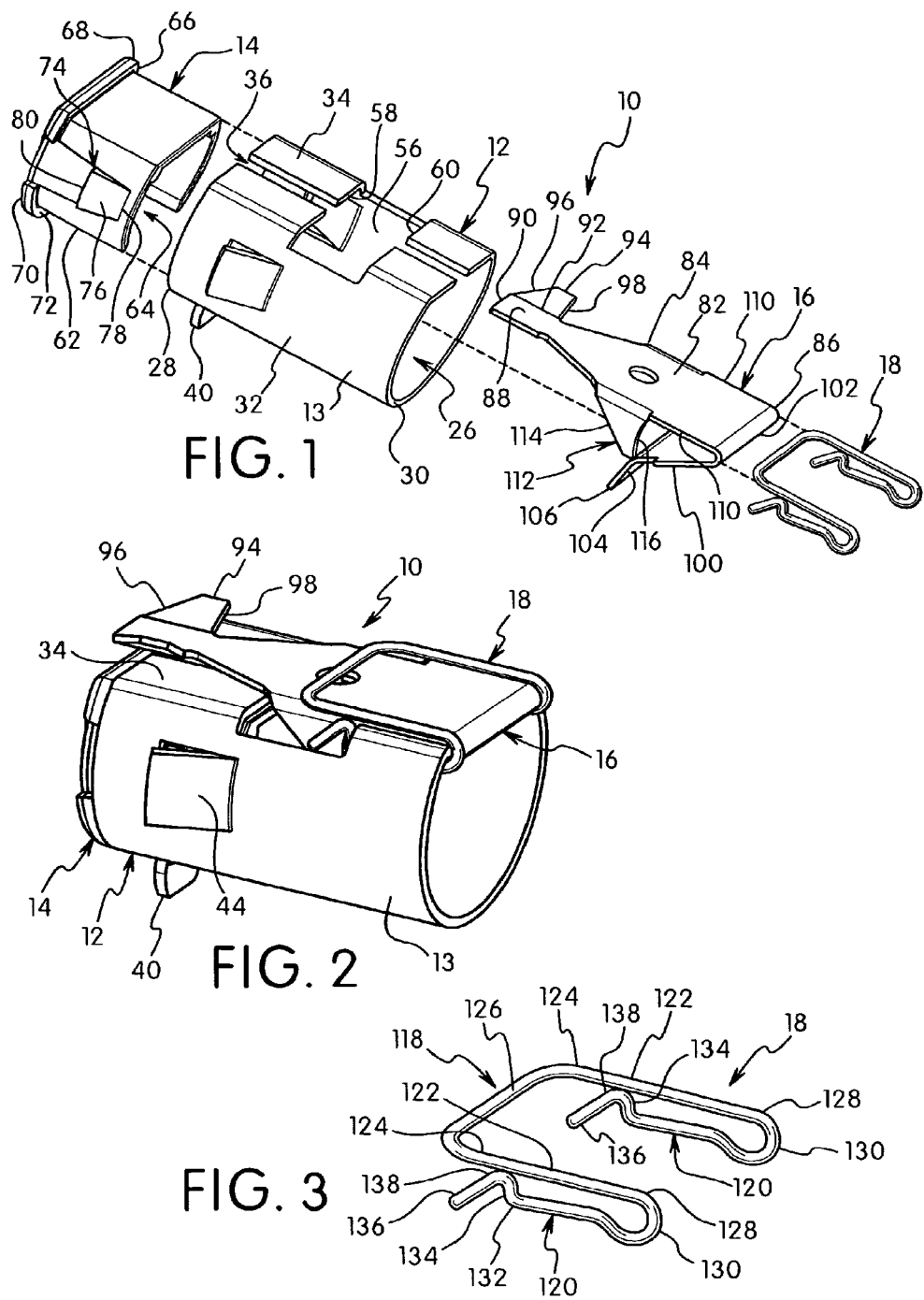

ELECTRICAL CABLE CONNECTOR ASSEMBLY AND RETAINING SPRING

FIELD OF THE INVENTION

The present invention is directed to a conduit connector assembly and retaining spring for connecting an electrical conduit and cable to an electrical box. More particularly, the invention is directed to a retaining spring for use with a conduit connector assembly for coupling the connection to an armored electrical cable prior to connecting the cable and connector assembly to an electrical box.

BACKGROUND OF THE INVENTION

Electrical wiring is connected to an electrical box which supports various electrical devices such as switches and electrical receptacles. The wiring in some environments includes an armor cable wound around the wiring to protect the wiring. The armor cable must then be coupled to the electrical box. A variety of coupling devices have been produced for connecting the armor cable or conduit to the electrical box without interfering with the electrical wires.

Electrical wiring is used for connecting electrical power lines and electrical outlets in order to provide access to electrical power in residential and commercial buildings. Electrical boxes are provided in the buildings to support electrical devices and to receive portions of the electrical wiring and contain and isolate therein splices in the wiring which extends from the junction boxes to the main electrical power lines and to outlets and switches in the building. For protection of the electrical wiring, the wiring is generally housed and carried within metal conduits or metal cables. It is also desirable to connect ends of the metal conduits to the electrical junction boxes.

Examples of various coupling devices and connectors include a body and a spring clip as disclosed in U.S. Pat. No. 5,731,543, U.S. Pat. No. 6,020,557 and U.S. Pat. No. 6,034,326, which are incorporated herein by reference in their entirety. The spring clips couple the armor cable to the connector body with a spring tension when the devices are inserted into the opening in the electrical box. These devices do not enable the conduit connector to be independently and securely attached to the armored cable before installation into the electrical box.

A variety of devices have been used over the years for connecting conduits which carry electrical wires to electrical junction boxes. Representative examples of these devices are disclosed in U.S. Pat. No. 3,369,071 to Tuisku, U.S. Pat. No. 4,012,578 to Moran et al., U.S. Pat. No. 4,021,604 to Dola et al., U.S. Pat. No. 4,880,387 to Stikeleather et al., U.S. Pat. No. 4,990,721 to Sheehan, U.S. Pat. No. 5,171,164 to O'Neil et al., U.S. Pat. No. 5,204,499 to Favalora, U.S. Pat. No. 5,276,280 to Ball, U.S. Pat. No. 5,285,013 to Schnell et al., U.S. Pat. No. 5,373,106 to O'Neil et al. and U.S. Pat. No. 5,422,437 to Schnell.

The prior connector device has performed with satisfaction over the years and met the objectives it was originally designed to achieve. However, many of these devices do not enable coupling of the cable independent of assembly with the electrical box. While the above noted connectors generally satisfy the intended need, there is a continuing need in the industry for improved conduit connector devices.

SUMMARY OF THE INVENTION

The present invention is directed to a connector assembly for connecting an electrical cable to an electrical box. The invention is particularly directed to a connector that can be coupled securely to a cable such as an armored cable independent of coupling the connector to an electrical box.

One aspect of the invention is to provide a cable connector that can also be preassembled and secured to a predetermined length of cable prior to shipping to the user for ease of assembly with the electrical box. The preassembled connector and cable (called a whip in the industry) are coupled together in a manner to resist the separation of the various components during shipping while maintaining the ease of use at the work site.

The present invention provides a conduit cable connector assembly for connecting a conduit carrying electrical wires to an electrical box. The electrical box is typically used to support electrical devices such as switches and electrical outlets. The connector in one embodiment of the invention includes four components coupled together for coupling to the conduit and to the electrical box.

The electrical connector assembly of the invention is simple to manufacture and assemble. The connector assembly can be connected to a flexible metal cable or conduit such as an armored cable before transporting to the work site. The connector assembly can also be connected to the cable at the work site for connecting the cable to an electrical box. The pre-assembly of the connector to the conduit provides easier assembly at the work site and reduces loss of parts and eliminates the need to assemble the connector and metal cable at the work site or to feed the cable through the cable connector.

The invention is also directed to a connector assembly having a body in the shape of a sleeve, a spring clip that is connected to the sleeve, and a retaining spring to couple the spring clip to the sleeve. The spring clip engages the cable and attaches the cable to the sleeve and connects the assembly to the electrical box. The retaining spring cooperates with the spring clip to prevent separation of the spring clip from the sleeve and to urge the spring clip into independent engagement with the cable.

The connector assembly of the invention provides a spring clip coupled to a sleeve member and has a first end that is able to engage the outer surface of the cable to retain the cable in the axial passage of the sleeve. The spring clip is biased by the retaining spring to connect with the metal clad cable under the tension of the retaining spring. The tension on the spring clip by the retaining spring also applies a force to the first end of the spring clip to apply a gripping force to the cable.

The invention further provides a retaining spring for a conduit cable connector assembly having a pair of legs that contact the inner surface of the sleeve on opposite sides of the sleeve and a body portion that engages the body of the spring clip to prevent separation of the spring clip from the sleeve.

A further aspect of the invention is to provide a conduit cable connector having a retaining spring and spring clip that can be incorporated into existing connector assemblies to couple the cable to the connector for the ease of assembly of the pre-cut electrical whip to an electrical box.

The various aspects of the invention are basically attained by providing a retaining spring for a conduit connector assembly for attaching a conduit carrying electrical wires to an electrical junction box. The retaining spring comprises a body having a first end for contacting an outer surface of a spring clip of the conduit connector assembly, and a second end opposite the first end. A first leg extends from the second end of the body for engaging an inner surface of the conduit connector assembly and being spring biased toward the body.

The aspects of the invention are also attained by providing a conduit connector assembly for coupling a conduit carrying electrical wires to an electrical junction box, which comprises a sleeve having a side wall, an open end, and an axial passage extending from a first end to a second end for receiving an electrical conduit and electrical wires. A spring clip is coupled to the sleeve. The spring clip has a main body portion with a first leg having a gripping end extending inwardly into the axial passage of the sleeve toward the first end of the sleeve for engaging the conduit and retaining the conduit in the sleeve. A retaining spring has a body engaging the spring clip and has at least one leg extending inwardly into the axial passage and engaging an inner surface of the sleeve for biasing the main body portion of the spring clip toward the sleeve.

The aspects of the invention are further attained by providing a conduit connector assembly for coupling to an electrical box, where the assembly comprises a sleeve having a side wall and an axial passage extending from a first end to a second end. An electrical cable extends within the axial passage of the sleeve. A spring clip is coupled to the sleeve. The spring clip has a main body portion with a first leg having a gripping end and extending axially into the axial passage. The main body portion is positioned adjacent an outer surface of the sleeve. A retaining spring engages an inner surface of the sleeve and the main body portion of the spring clip to bias the retaining spring and first leg into engagement with the electrical cable and to couple the electrical cable to the sleeve.

These and other aspects of the invention will become apparent form the following detailed description of the invention which taken in conjunction with the annexed drawings discloses various embodiments of the invention.

BRIEF DESCRIPTION OF THE DRAWINGS

The following is a brief description of the drawing in which:

FIG. 1 is an exploded side view of the connector assembly in one embodiment of the invention;

FIG. 2 is a perspective view showing the retaining spring coupled to the connector assembly for retaining the spring clip to the sleeve;

FIG. 3 is a perspective view of the retaining spring in one embodiment of the invention;

DETAILED DESCRIPTION OF THE INVENTION

The present invention is directed to a conduit connector assembly for coupling a conduit or metal clad cable to an electrical box. The invention is particularly directed to a conduit and connector assembly (a whip) that is able to couple an electrical conduit to a body of the assembly prior to coupling to an electrical box.

The assembly of the invention provides a structure that enables the conduit to be connected to the connector assembly so the connector is retained on the end of the conduit independent of assembly with the electrical box. The assembly allows pre-assembly of the conduit to the connector assembly to simplify the assembly at the work site. The conduit connector assembly of the invention basically includes a sleeve, a grommet, a spring clip and a retaining spring. The spring clip is attached to the body to grip the conduit to the body and to attach the body to an electrical box. The conduit is typically a spirally wound, corrugated armor cable as known in the art.

Figure 6:
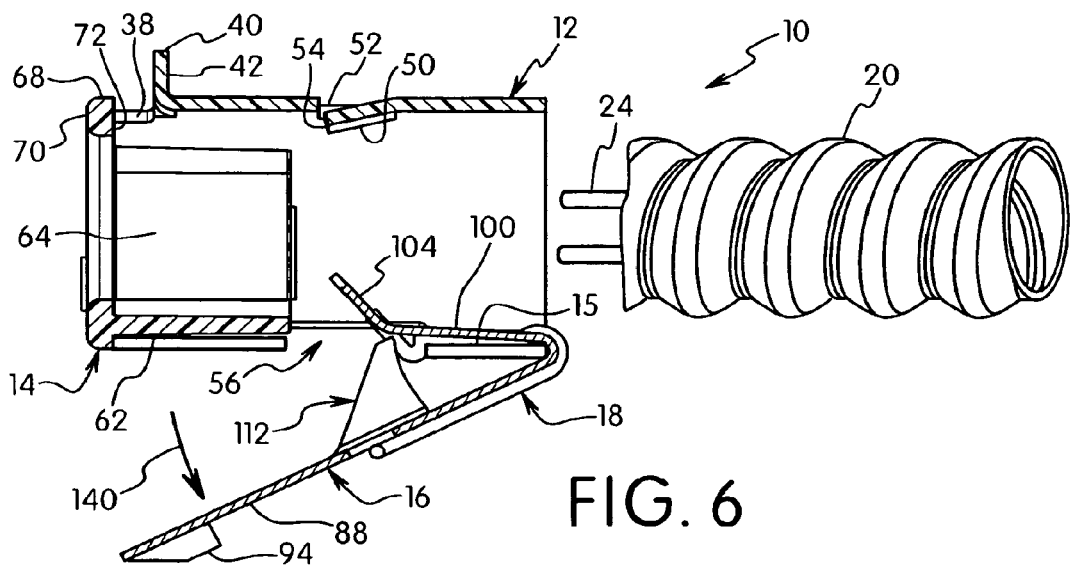
FIG. 6 is a partial cross-sectional view of the connector assembly and the cable showing the connector assembly in cross section.
Figure 7:
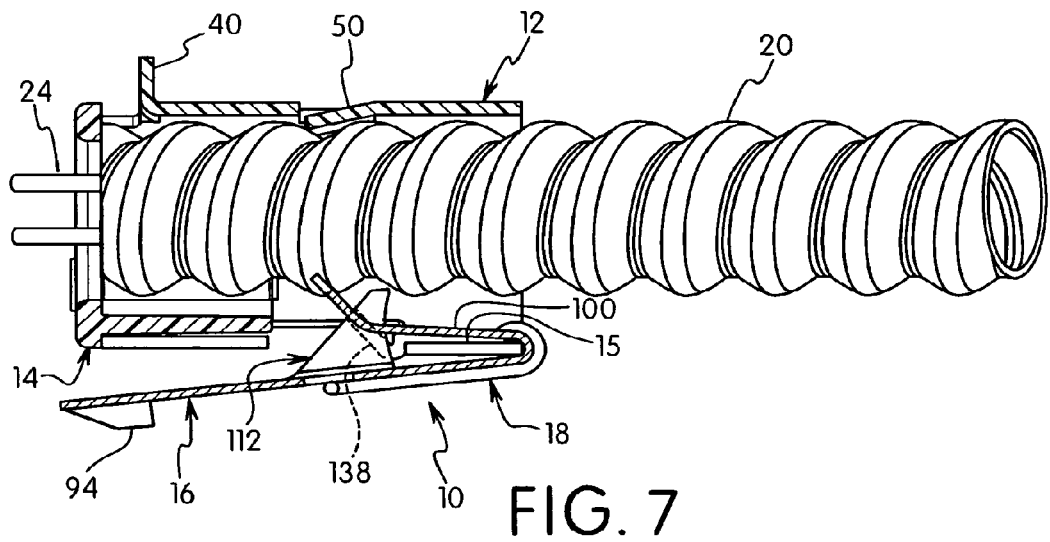
FIG. 7 is a side view in partial cross-section showing the connector assembly coupled to a cable.
Figure 8:
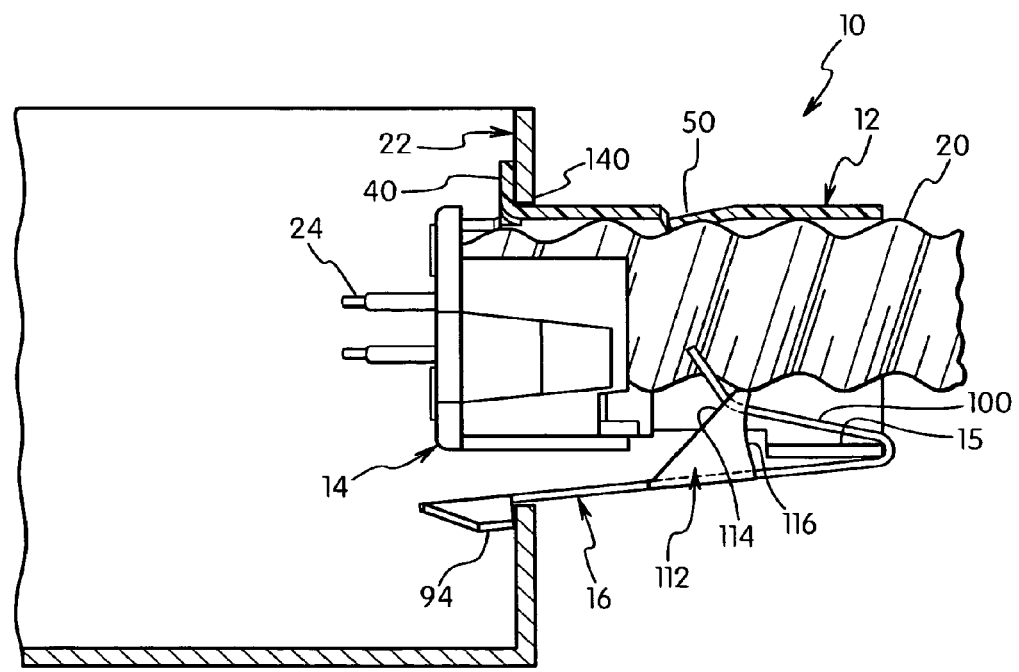
FIG. 8 is a partial cross-sectional view showing the connector assembly and the cable coupled to an electrical box with the retaining spring removed

Referring to the drawings, the conduit assembly 10 of the invention includes a sleeve 12, a grommet 14, a spring clip 16 and a retainer spring 18. The conduit connector assembly 10 as shown in FIGS. 7 and 8 is used for coupling an electrical cable 20 to an electrical box 22. The cable 10 in the embodiment shown is a flexible armored cable that carries a plurality of electrical wires 24 as shown in FIG. 6. The cable is typically formed from a metal sheath that is wound in a spiral fashion to form a corrugated protective conduit. The conduit of cable 20 is formed with a spiral recess defined between peaks and valleys. The armored sheath is cut to length to expose the wires 24 for connecting with a suitable electrical device as known in the art. The armored sheath of the cable is typically formed from aluminum or steel, although other materials can be used.

The sleeve 12 and spring clip 16 have a shape and construction substantially similar to the body shown and described in U.S. Pat. No. 6,034,326 which is hereby incorporated by reference in its entirety. The body is formed from a rigid material such as steel or other metals and is shaped by bending a blank into a generally cylindrical shape. Referring to FIG. 1, the sleeve 12 has a side wall 13 shaped to form an axial passage 26 extending between a first end 28 and a second end 30. As shown in FIG. 1, sleeve 12 has a substantially cylindrical side wall portion 32 and the flat side wall portion 34. The flat side wall portion 34 has a longitudinal slot 36 formed by the side edges of a blank used to form sleeve 12. Slot 36 extends the length of sleeve 12 and enables the sleeve to expand or contract to fit within an opening of an electrical box as needed. Cylindrical side wall portion 32 has a shape and dimension to fit within the opening of the electrical box.

Figure 5:
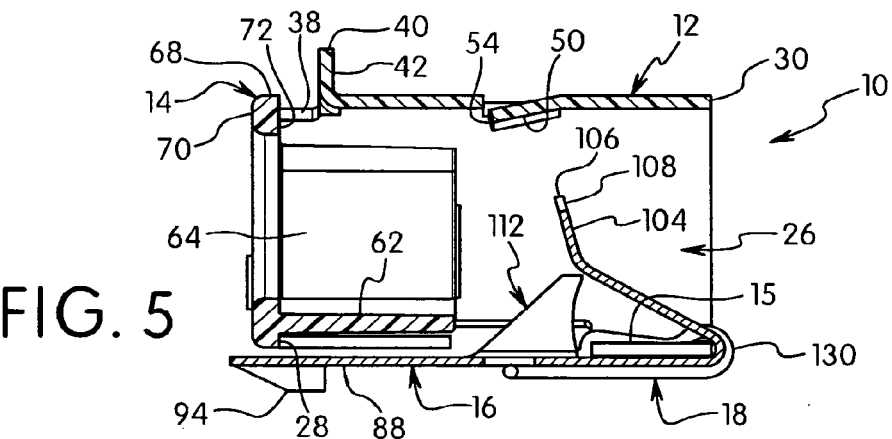
FIG. 5 is a cross sectional view of the connector assembly taken along line 5-5 of FIG. 4.

Referring to FIG. 5, first end 28 of sleeve 12 has a substantially flat edge and has a cutout portion 38 formed on an opposite side of flat side wall portion 34. A connecting tab 40 is cut from cylindrical side wall portion 32 which is bent outwardly in a radial direction with respect to cylindrical side wall portion 32 of sleeve 12. As shown in FIG. 5, connecting tab 40 is bent to define cutout portion 38. Connecting tab 40 has a shape and dimension to contact an inner surface of the electrical box as shown in FIG. 8 when cable connector assembly 10 is coupled to the electrical box 22. Connecting tab 40 has a substantially flat face 42 extending perpendicular to the longitudinal axis of sleeve 12 and substantially parallel to first end 28 of sleeve 12.

Figure 4:
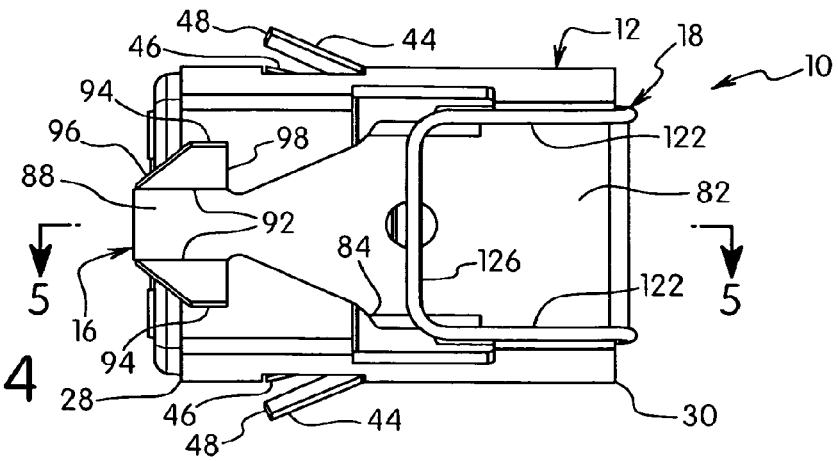
FIG. 4 is top view of the connector assembly.

Cylindrical side wall portion 32 has a pair of tabs 44 on opposite sides cut from sleeve 12 and bent outwardly at an inclined angle as shown in FIGS. 1 and 4. Tabs 44 cut from sleeve 12 form openings 46 through sleeve 12. As shown in FIG. 4, tabs 44 are positioned on opposite sides of sleeve 12 and on each side of flat side portion 34. Tabs 44 are angled to extend in a generally forward direction toward first end 28 and have an end face 48 substantially parallel to first end 28 and connecting tab 40 as shown in FIG. 5. The flat face 42 of connecting tab 40 lies in a plane spaced from the plane of the end face of tabs 44 a distance corresponding substantially to the thickness of the wall of an electrical box 22. In this manner, tabs 44 contact an outer surface of the wall of the electrical box 22 when assembled while connecting tab 40 contacts an inner surface of the wall of the electrical box.

Referring to FIG. 5, cylindrical side wall portion 32 of sleeve 12 includes an inwardly extending connecting tab 50. Connecting tab 50 is cut from cylindrical side wall portion 32 and is bent inwardly at an inclined angle to form opening 52 as shown in FIG. 6. Connecting tab 50 is spaced axially from connecting tab 40 with respect to the longitudinal direction of sleeve 12. As shown in FIG. 5, tab 50 is bent at an inclined angle and extends toward the first end 28 of sleeve 12 a distance sufficient to engage the outer surface of the electrical cable. Tab 50 has a forward end 54 facing first end 28 and spaced from connecting tab 40. In one embodiment of the invention as shown in FIGS. 5 and 6, forward end 54 of tab 50 is formed at a slight angle with respect to the longitudinal axis of sleeve 12 to enable gripping of the spiral wound armor sheath of the electrical cable 20.

An opening 56 is provided in flat side wall portion 34 of sleeve 12 and is spaced between first end 28 and second end 30. Opening 56 is formed by cutouts along each edge of the blank forming sleeve 12. Opening 56 is formed with substantially straight forward edges 58 and rear straight edges 60. Forward edge 58 is formed substantially parallel to first end 28 of sleeve 12 and is spaced from connecting tab 40.

Grommet 14 is inserted into first end 28 of sleeve 12 as shown in FIGS. 1, 2 and 5. Grommet 14 has a substantially cylindrical shape with a body 62 forming a sleeve with an axial passage 64 for receiving wires from the electrical cable. Grommet 14 has a first end 66 with a collar 68 extending outward in a generally radial direction. Collar 68 has an outer face 70 and an inner face 72. Collar 68 has a radial dimension sufficient to engage the end of electrical cable 20 to protect the wires 24 from contacting the end of the armor sheath of the cable to prevent damage to the wires during use. Grommet 14 is generally formed from a molded rigid plastic material as a one piece member.

Body 62 of grommet 14 includes locking tabs 74 integrally formed therewith and extending in an outward direction with respect to grommet 14. Locking tabs 74 have an inclined face converging toward a second end 78 of body 62. Locking tabs 74 have a straight forward face 80 facing first end 66 and being substantially parallel to collar 68. Grommet 14 is generally made from a one piece member of molded plastic.

Spring clip 16 of connector assembly 10 is typically made of spring steel, although other materials can be used. As shown in FIG. 1, spring clip 16 has a substantially U-shape with a planar main body 82. Body 82 of spring clip 16 has a first end 84 and a second end 86. First end 84 has a leg 88 extending outwardly and lying in substantially the same plane as main body 82. An outer end 90 of leg 88 includes side edges 92 and coupling tabs 94 extending outwardly therefrom. Coupling tabs 94 as shown in FIG. 1 are oriented at an incline with respect to the plane of main body 82 and extend in a direction outwardly from main body 82. Coupling tabs 94 have a forward edge 96 that are formed at an angle that converge toward outer end 90 of leg 88 for guiding coupling tabs 94 through an opening in an electrical box. Coupling tabs 94 also include a rear edge 98 that extend substantially perpendicular to a longitudinal dimension of main body 82. Coupling tabs 94 and rear edge 98 have a dimension to pass through an opening in an electrical box and to engage an inner surface of the electrical box while coupling the conduit connector assembly 10 to the electrical box.

Second end 86 of main body portion 82 of spring clip 16 has a second leg 100 extending in a forward direction toward first end 84 and positioned at an incline with respect to the plane of main body portion 82. As shown in FIG. 1, second leg 100 has a width substantially equal to the width of main body 82 and is connected to main body 82 by a U-shaped portion 102 which forms a spring hinge. Second leg 100 has an outer end 104 that extends outwardly from main body portion 82 at an inclined angle toward the axial center of sleeve 12. Referring to FIG. 5, outer end 104 has a terminal end 106 with a substantially U-shaped recessed portion 108 for engaging the outer surface of electrical cable 20.

Main body 82 of spring clip 16 has side edges 110 with integrally formed retaining tabs 112. Retaining tabs 112 are integrally formed with main body 82 and extend in a plane substantially perpendicular to the plane of main body 82. Retaining tabs 112 have a first inclined forward edge 114 that extend toward first edge 84 of main body 82. Retaining tabs 112 also have a second trailing edge 116 forming a curved recessed surface.

Retaining spring 18 as shown in FIGS. 1 and 3 forms a substantially U-shaped spring with a body portion 118 and legs 120. In the embodiment illustrated, body portion of retainer spring 18 is formed by two parallel side members 122 forming top legs having a first end 124 connected together by a cross member 126. Side members 122 have a second end 128 connected to a respective leg 120. Retaining spring 18 is removably coupled to sleeve 12 and cooperates with sleeve 12 and spring clip 16 to bias the leg 100 of spring clip 16 into engagement with electrical cable 20. In the embodiment shown and discussed herein, retaining spring 18 engages an outer surface of the spring clip 16 and an inner surface 15 of the sleeve 12 to bias leg 100 toward the axial center and into engagement with the electrical cable.

Legs 120 as shown in FIG. 3 extend in a generally longitudinal direction with respect to a longitudinal dimension of body portion 118. Legs 120 are coupled to body portion 118 by a U-shaped portion 130 defining a spring hinge. Legs 120 have a longitudinal end 132 with a first portion 134 bent toward body portion 118 and a second portion 136 bent away from body portion 118. First portion 134 and second portion 136 define a hook-like member 138 for coupling retainer spring 18 to sleeve 12.

Cable connector assembly 10 is coupled to electrical cable 20 which can then be attached to electrical box 22 as shown in FIG. 8. In one embodiment, electrical cable 20 is cut to a desired length and then inserted into axial passage 26 of sleeve 12 and grommet 14 as shown in FIGS. 6 and 7.

Wires 24 extend through grommet 14 for connecting to an electrical device. The cable connector assembly 10 is assembled by inserting the second leg 100 of spring clip 16 into the axial passage 26 of sleeve 12. Retaining tabs 112 are inserted through opening 46 in flat face 42 of sleeve 12 as shown in FIG. 5. Retaining tabs 112 when positioned in opening 56 resist axial movement of spring clip 16 with respect to sleeve 12. Retainer spring 18 is then assembled onto spring clip 16 by sliding legs 120 through the axial passage 26 of sleeve 12 until the hook portions 138 of legs 120 are received in opening 56 as shown in FIGS. 2 and 5. Legs 120 in the illustrated embodiment are spaced apart to contact the inner surface of sleeve 12 on each side of spring clip 16 so as not to interfere with the leg 100 which engages the cable 20. Retainer spring 18 is constructed so that legs 120 are spring biased toward body portion 118. In this manner, cross member 126 in the embodiment illustrated in FIG. 2 contacts the outer surface of main body 82 of spring clip 16 to hold main body 82 against the flat face 34 of sleeve 12 and retaining tabs 112 within opening 56 with the leg 100 of spring clip 16 biased toward the center of sleeve 12. Thus, retainer spring 18 can prevent separation of spring clip 16 from sleeve 12.

As shown in FIG. 5, retainer spring 18 couples spring clip 16 to sleeve 12 so that second leg 100 is directed toward the center of sleeve 12. Main body 82 of spring clip 16 can be manually lifted in the direction of arrow 140 shown in FIG. 6 or can slide cable 20 into place to retract second leg 100 from the center of the sleeve 12. Electrical cable 20 is then inserted through axial passage 26 to extend the electrical wires through the opening in grommet 14. Main body 82 of spring clip 16 is then released so that second leg 100 engages the outer surface of electrical cable 20 to securely couple electrical cable 20 to assembly 10 as shown in FIG. 7. Retainer spring 18 applies a biasing force to main body 82 of spring clip 16 to apply a force against electrical cable 20 to prevent separation of electrical cable 20 from assembly 10 during shipping or handling. In this embodiment, the connector assembly 10 and electrical cable 20 can be preassembled as a whip and shipped to the work site until ready for use.

Cable connector assembly 10 and electrical cable 20 are then attached to electrical box 22 by inserting the tab 40 and forward end of sleeve 12 through an opening 140 in electrical box 22 as shown in FIG. 8. Typically, retainer spring 18 is removed or separated from sleeve 12 and spring clip 18 to enable main body 82 and arm 88 to be spring biased outwardly into engagement with the opening in the electrical box. First leg 88 of spring clip 16 is also inserted through the opening in electrical box 22 so that coupling tabs 94 engage an inner surface of the electrical box to securely couple the assembly 10 to the electrical box. Typically, retainer spring 18 is removed from sleeve 12 by disengaging the hook portions 138 of legs 120 and sliding retainer spring 18 axially away from spring clip 16 and sleeve 12. The biasing spring force of spring clip 16 urges main body 82 away from second leg 100 and sleeve 12 so that coupling tabs 94 engage the opening in electrical box 22.

While various embodiments have been shown to illustrate the invention, it will be understood by those skilled in the art that various changes and modifications can be made without departing from the scope of the invention as defined in the appended claims.

What is claimed is:

1. A retaining spring for a conduit connector assembly for attaching a conduit carrying electrical wires to an electrical junction box where the conduit connector assembly has a sleeve and a spring clip, said retaining spring comprising:
   a body having a first end for contacting an outer surface of the spring clip of the conduit connector assembly, and a second end opposite said first end;
   a first leg extending from said second end of said body for engaging an inner surface of the conduit connector assembly and being spring biased toward said body.

2. The retaining spring of claim 1, wherein said first leg has a first end coupled to said body by a substantially U-shaped spring portion for biasing said first leg toward said body.

3. The retaining spring of claim 2, wherein said first leg has a second end with a hook portion for engaging an opening in the sleeve of the conduit connector assembly.

4. The retaining spring of claim 1, wherein said body includes first and second spaced apart body portions connected together by a cross member.

5. The retaining spring of claim 4, wherein said first leg is coupled to a second end of said first body portion, and further comprising a second leg extending from a second end of said second body portion.

6. A conduit connector assembly for coupling a conduit carrying electrical wires to an electrical junction box, comprising:
   a sleeve having a side wall with an axial passage extending from a first end to a second end for receiving an electrical conduit and electrical wires;
   a spring clip coupled to said sleeve, said spring clip having a main body portion with a first leg having a gripping end extending inwardly into said axial passage of said sleeve toward said first end of said sleeve for engaging the conduit and retaining the conduit in the sleeve; and
   a retaining spring having a body engaging said spring clip and having at least one leg extending inwardly into said axial passage and engaging an inner surface of said sleeve for biasing said first leg of said spring clip toward said sleeve.

7. The conduit connector assembly of claim 6, wherein said body of said retaining spring has a first end for engaging said spring clip, and
   said legs said at least one leg extending into said axial passage for engaging the inner surface of the sleeve.

8. The conduit connector assembly of claim 7, wherein each leg of said retaining spring is coupled to said body by a U-shaped spring portion for biasing said leg toward said body of said retaining spring.

9. The conduit connector assembly of claim 6, wherein said at least one leg of said retaining spring has a first end coupled to said body and a second end opposite from said first end, said second end having a first portion extending toward said body of said retaining spring.

10. The conduit connector assembly of claim 9, wherein said at least one leg of said retaining spring has a second portion coupled to said first portion and extends away from said body of said retaining spring.

11. The conduit connector assembly of claim 10, wherein said sleeve has a side wall with an aperture, and wherein said spring clip has a tab extending from the main body into said aperture.

12. The conduit connector assembly of claim 11, wherein said first portion of said leg of said retaining spring is received in said aperture for coupling said retaining spring to said sleeve.

13. The conduit connector assembly of claim 12, wherein said main body portion of said spring clip has a first end and a second end, said first end having a second leg extending therefrom and having outwardly extending coupling tabs for coupling to the electrical junction box and where the second leg is biased to apply an outward tension with respect to said conduit connector assembly.

14. The conduit connector assembly of claim 6, wherein said body of said retaining spring comprises first and second body portions spaced apart from each other and being coupled together by a cross member.

15. A conduit connector assembly for coupling to an electrical box, the assembly comprising:
   a sleeve having a side wall, an open end, and an axial passage extending between a first end to a second end;
   an electrical cable positioned in said axial passage of said sleeve;
   a spring clip coupled to said sleeve, said spring clip having a main body portion with a first leg having a gripping end and extending axially into said axial passage, said main body portion being positioned adjacent an outer surface of said sleeve; and
   a retaining spring engaging an inner surface of said sleeve and engaging said spring clip to bias said first leg into engagement with said electrical cable and to couple said electrical cable to said sleeve.

16. The conduit connector assembly of claim 15, wherein said retaining spring has a body and a first leg defining a substantially U-shape, and where said body and said first leg are biased toward each other, said first leg engaging the inner surface of the sleeve and said body engaging said main body portion of said spring clip.

17. The conduit connector assembly of claim 16, wherein
said body of said retaining spring has first and second spaced apart body portions having a first end and a second end, a cross member extending between said first ends of said body portions;
said first leg having a first end coupled to a second end of said first body portion; and
said retaining spring having a second leg with a first end coupled to a second end of said second body portion.

18. The conduit connector assembly of claim 17, wherein each of said first leg and second legs of said retaining spring has a first portion extending toward said body of said retaining spring.

19. The conduit connector assembly of claim 18, further comprising a second portion coupled to each of said first portions and extending in a direction away from said body of said retaining spring, said first portion and said second portion of each leg forming a hook portion.

20. The conduit connector assembly of claim 19, wherein said sleeve has at least one aperture in said side wall and where said hook portion is received in said at least one aperture.

21. The conduit connector assembly of claim 15, wherein said retaining spring is removable from said sleeve and spring clip.

22. The conduit connector assembly of claim 15, wherein said spring clip further includes a tab for coupling said spring clip to said sleeve.

23. The conduit connector assembly of claim 22, wherein said retaining member is received in an aperture in said side wall of said sleeve.

24. The conduit connector assembly of claim 15, wherein said first leg of said spring clip has an end engaging said electrical cable, and said spring clip having a second leg extending from said main body portion for coupling with said electrical box.

* * * * *